United States Patent
Canal Vila et al.

(10) Patent No.: US 12,044,207 B2
(45) Date of Patent: Jul. 23, 2024

(54) METHODS AND SYSTEMS FOR DETERMINING ROUGHNESS OF WIND TURBINE BLADES AND WIND TURBINE CONTROL

(71) Applicant: General Electric Renovables Espana, S.L., Barcelona (ES)

(72) Inventors: Marc Canal Vila, Barcelona (ES); Saskia Honhoff, Garching (DE); Shanmuga-Priyan Subramanian, Hamburg (DE); Thomas Jean Picard, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/979,976

(22) Filed: Nov. 3, 2022

(65) Prior Publication Data

US 2023/0147218 A1    May 11, 2023

(30) Foreign Application Priority Data

Nov. 5, 2021   (EP) .................................. 21383007

(51) Int. Cl.
*F03D 17/00* (2016.01)
(52) U.S. Cl.
CPC .......... *F03D 17/00* (2016.05); *F05B 2260/80* (2013.01); *F05B 2270/32* (2013.01); *F05B 2270/327* (2013.01); *F05B 2270/328* (2013.01)
(58) Field of Classification Search
CPC ..................................................... F03D 17/00
See application file for complete search history.

(56) References Cited

U.S. PATENT DOCUMENTS

| 9,759,068 B2 | 9/2017 | Herrig et al. |
| 10,202,965 B2 | 2/2019 | Bertolotti et al. |
| 2013/0149145 A1* | 6/2013 | Shibata ................... F03D 80/40 416/61 |
| 2014/0241878 A1 | 8/2014 | Herrig et al. |

FOREIGN PATENT DOCUMENTS

| EP | 2772643 A2 | 9/2014 |
| EP | 3139038 B1 | 3/2019 |
| WO | WO2017211367 A1 | 12/2017 |

OTHER PUBLICATIONS

European Search Report Corresponding to EP21383007 on Apr. 22, 2022.

* cited by examiner

*Primary Examiner* — Michael L Sehn
(74) *Attorney, Agent, or Firm* — Dority & Manning, P.A.

(57) ABSTRACT

The present disclosure relates to methods (100, 200) for controlling and operating wind turbines (10). More particularly, the present disclosure relates to methods and systems for determining a surface condition of one or more wind turbine blades (22) of a wind turbine (10). a method comprises rotating the wind turbine rotor (18) under the influence of a wind in predetermined rotation conditions, wherein the predetermined rotation conditions include at least a predetermined pitch angle (252) of the additional wind turbine blades (222, 223). The method further comprises determining a current value of one or more parameters of the wind turbine (10) when rotating in the predetermined rotation conditions and comparing the current value of the one or more parameters of the wind turbine with one or more reference values (37) to determine the surface condition of the wind turbine blades (22).

13 Claims, 6 Drawing Sheets

METHODS AND SYSTEMS FOR DETERMINING ROUGHNESS OF WIND TURBINE BLADES AND WIND TURBINE CONTROL

The present disclosure relates to methods for controlling and operating wind turbines. More particularly, the present disclosure relates to methods for determining or detecting wind turbine blade roughness and methods of operating a wind turbine, as well as to wind turbine controllers and wind turbines.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven" or "gearless") or through the use of a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that may contain and protect the gearbox (if present) and the generator (if not placed outside the nacelle) and, depending on the wind turbine, further components such as a power converter and auxiliary systems.

During operation of a wind turbine, the outer surface of the wind turbine blades, and in particular the leading edges and adjacent surface areas, may get dirty. For example dust, pollen, insects, salt or ice may accumulate on an outer surface of a wind turbine blade. Wind turbine blades may also erode due to impacts received on the blades, e.g. by rain, hail and particles in the wind. Dirty and/or eroded blades have a more irregular surface than clean blades which can have a significant impact on the air flow around the blades. Roughened blades generally produce less lift and more drag for a given wind flow, which reduces the power produced by the wind turbine. For example, roughened blades may cause a reduction of annual energy production (AEP) between 2% and 5%, which is a non-negligible loss.

Blade roughness may be monitored to check whether it may be necessary to trigger some corrective action, e.g. to clean or to repair the blades, or whether the wind turbine may be instructed to increase its power production, e.g. after a rainfall which may have removed some dirt from the blades. Blade inspection may be time consuming and expensive to perform, and it generally requires the presence of one or more operators. In addition, access to possibly affected blade regions may be difficult, and the monitoring equipment may be sensible to external conditions. In some examples, drones may be used. In these or other examples, pictures may be taken, e.g. with an infra-red camera, but a lot of post-processing of the images may be required.

The present disclosure aims to provide an improved determination or detection of blade roughness.

SUMMARY

In an aspect of the present disclosure, a method for determining a surface condition of one or more wind turbine blades of a wind turbine comprising rotor including a first wind turbine blade and one or more additional wind turbine blades is provided. The method comprises rotating the wind turbine rotor under the influence of a wind in predetermined rotation conditions, wherein the predetermined rotation conditions include at least a predetermined pitch angle of the additional wind turbine blades. The method further comprises determining a current value of one or more parameters of the wind turbine when rotating in the predetermined rotation conditions. The method further comprises comparing the current value of the one or more parameters of the wind turbine with one or more reference values to determine the surface condition of one or more of the wind turbine blades.

According to this aspect, one or more values of one or more parameters may be determined while the wind turbine rotor is rotating in predetermined rotation conditions and then compared to corresponding reference values. Reference values of parameters are known, e.g. they may have been determined at a previous time at a specific wind turbine rotor configuration.

Comparing current values of one or more wind turbine parameters determined in predetermined rotation conditions, wherein the predetermined rotation conditions include at least a predetermined pitch angle of the wind turbine blades other than the first wind turbine blade, to reference values may help to detect a condition of the blade surface, and particularly an indication of roughness without the use of blade sensors or drones. The presence of operators may also be avoided. As taking images may be omitted, a time-consuming post processing may also be dispensed with. A faster and more autonomous detection of blade roughness may therefore be provided.

Throughout this disclosure, a pitch angle of a wind turbine blade may be understood as an angle that may be measured, in cross-section, between a reference line and a chord of the blade. The reference line may be substantially parallel, e.g. included, in a wind turbine rotor plane in some examples.

Throughout this disclosure, blade roughness may refer to how irregular an outer surface of a blade, or a specific region of the outer surface of the blade, may be. Herein, a rough blade may refer to a blade whose surface differs from the surface of the blade when it was clean or cleaner and wherein the effect of the roughness is noticeable on the wind turbine performance. I.e. the air flow around the blade is affected to such an extent that lift and/or drag for a blade differs at a given angle of attack and given wind speed. For example, a rough blade may include irregularities that the blade did not include when a reference of cleanliness was obtained, e.g. protrusions and/or recesses, and these irregularities may affect the power produced by the wind turbine, generally in a negative way. For example, irregularities may e.g. create a more turbulent flow, a bigger wake, or a different point of separation of the air flow from the blade.

Throughout this disclosure, a clean blade may be understood as a smooth blade, i.e. a blade whose outer surface has not yet been affected, or at least not significantly affected, by matter accumulation and/or erosion. Matter accumulation may for example include dirt and ice. A surface of a clean blade may be a surface as designed and manufactured. A clean blade may be mounted atop of a wind turbine tower, e.g. during installation of a wind turbine. As the clean blade is at the beginning of its service life, it may not yet have accumulated dirt, ice or other and/or been eroded, at least in a significant manner. It may be understood that a clean blade is able to provide a maximum power output according to design specifications under optimum conditions. During blade installation, it might accumulate some dirt and/or it might be slightly eroded, but this will generally not have a significant effect and therefore the blade in the context of the present disclosure would be considered to be a clean blade. A clean blade may be used for obtaining reference values to which to compare values determined a certain period of time after the wind turbine has started to operate, e.g. days, weeks or months subsequent to the start of operation of the wind turbine.

Throughout this disclosure, a semi-clean blade may refer to a blade which has an outer surface differing from a blade surface when the blade was new, i.e. "clean", for example due to erosion or the fact that the blade might have been repaired blade and its surface may be slightly different from when it was new. A semi-clean blade may for instance be a cleaned blade or a repaired blade. Semi-clean blades may also serve for determining reference values of one or more parameters.

Throughout this disclosure, it may be understood that a wind turbine is in operation when its rotor is rotating at a speed high enough to produce energy and the generator of the wind turbine is producing electrical power.

In a further aspect of the disclosure, a wind turbine controller is provided. The controller comprises a communications module, a processor, and a memory. The memory comprises instructions that, when executed by the processor, cause the processor to execute one or more of the method steps disclosed herein.

Still in a further aspect of the disclosure, a method for controlling a wind turbine is provided. The method comprises determining one or more reference values of one or more wind turbine parameters with a first blade positioned at a reference value of a first pitch angle and the remaining blades positioned at a reference value of a second pitch angle for an idling wind turbine rotor before the wind turbine starts to operate. The method further comprises starting wind turbine operation; and after a period of time, starting to idle the wind turbine rotor and positioning the first blade at the reference value of the first pitch angle and the remaining blades at the reference value of the second pitch angle. The method further comprises, determining one or more current values of one or more wind turbine parameters and compare them to the corresponding reference values. The method further comprises adapting the wind turbine operation based on the comparison.

DETAILED DESCRIPTION OF EXAMPLES

Reference now will be made in detail to embodiments of the present disclosure, one or more examples of which are illustrated in the drawings. Each example is provided by way of explanation only, not as a limitation. In fact, it will be apparent to those skilled in the art that various modifications and variations can be made in the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Figure 1:
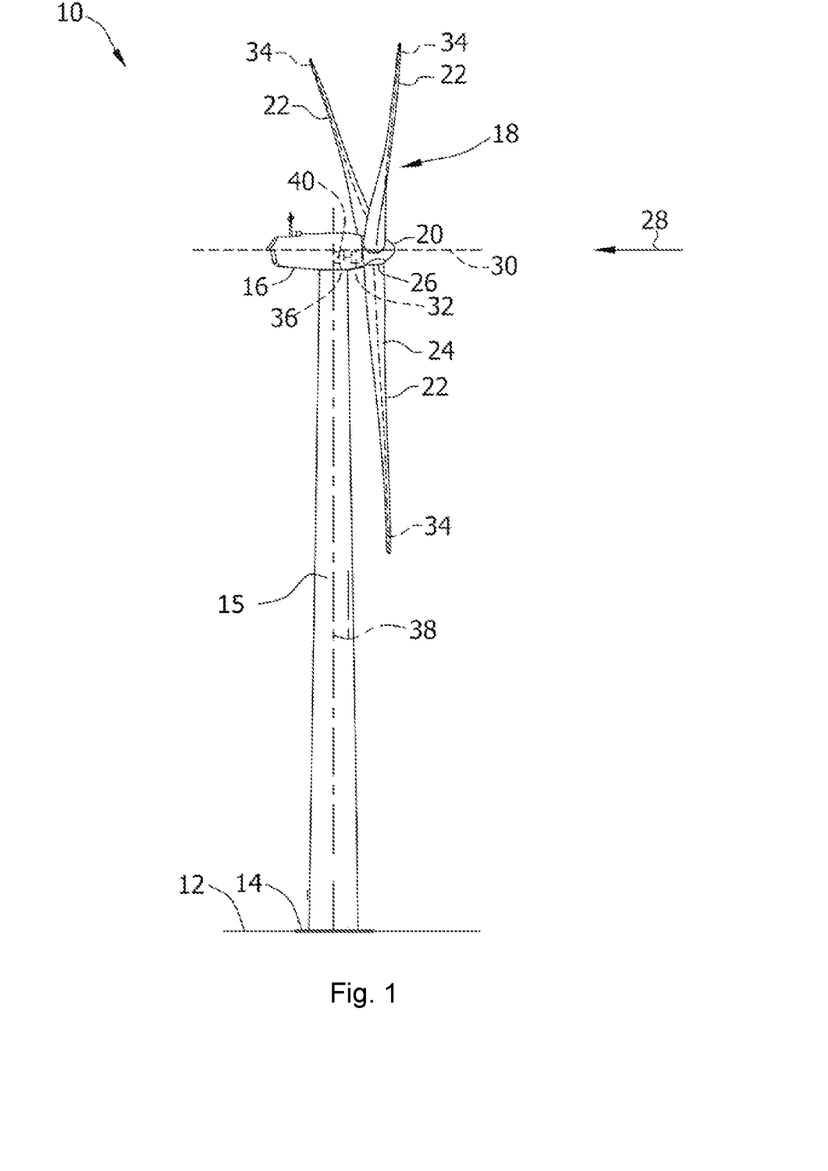
FIG. 1 illustrates a perspective view of one example of a wind turbine.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root region 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, e.g. an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16; however, the wind turbine controller 36 may be a distributed control system throughout the wind turbine 10, on the support system 14, within a wind farm, and/or at a remote-control center. The wind turbine controller 36 includes one or more processors 40 configured to perform the steps and/or methods described herein, see also FIG. 3. Further, many of the other components described herein include one or more processors.

Figure 2:
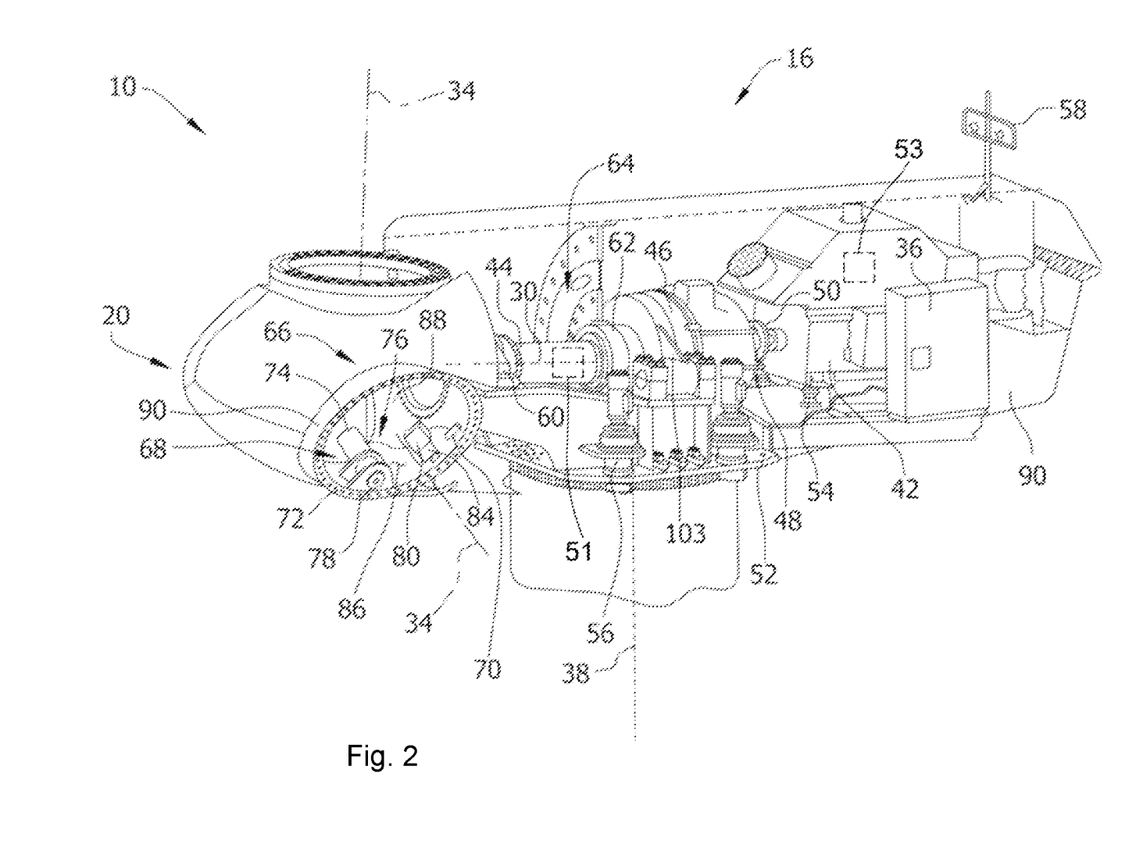
FIG. 2 illustrates a simplified, internal view of one example of the nacelle of the wind turbine of the FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between e.g. 400V to 1000 V into electrical energy having medium voltage (e.g. 10-35 KV). Offshore wind turbines may have for example generator voltages between 650 V and 3500 V, and transformer voltages may for instance be between 30 kV and 70 kV. Said electrical energy is conducted via power cables from the nacelle 16 into the tower 15.

In some examples, the wind turbine 10 may include one or more shaft sensors 51. The shaft sensors may be configured to monitor at least one of torque loads acting on the main shaft 44 and/or the high-speed shaft 48, and a rotational speed of the shaft 44, 48. In some examples, the wind turbine 10 may include one or more generator sensors 53. The generator sensors may be configured to monitor at least one of a rotational speed of the generator 42 and a generator torque. Shaft sensors 51 and/or generator sensors 53 may include, for instance, one or more torque sensors (e.g., strain gauges or pressure sensors), optical sensors, accelerometers, magnetic sensors, speed sensors and Micro-Inertial Measurement Units (MIMUs).

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operates at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and an anemometer. The meteorological measurement system 58 can provide information to the wind turbine controller 36 that may include wind direction 28 and/or wind speed.

In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

Figure 3:
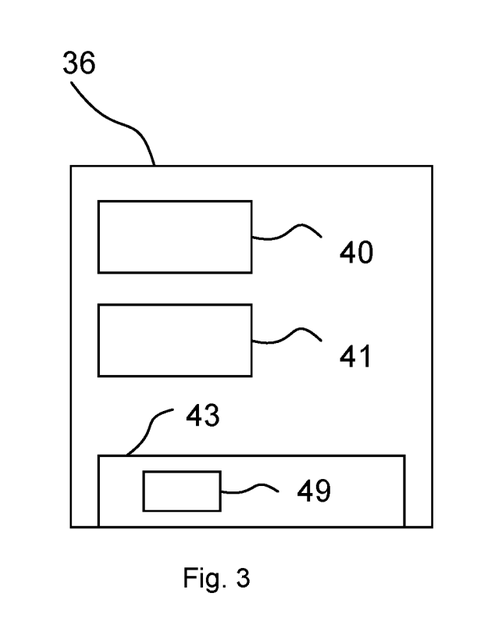
FIG. 3 schematically illustrates an example of a controller for a wind turbine.

FIG. 3 schematically illustrates an example of a wind turbine controller 36 or control system 36. The controller 36 may be configured to perform one or more of the methods, steps, determinations and the like disclosed herein. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein.

A control system 36 may also include a memory 41, e.g. one or more memory devices. A memory 41 may comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 41 may generally be configured to store suitable computer-readable instructions that, when implemented by the processor(s) 40, configure the controller 36 to perform, or trigger the performance of, various steps disclosed herein. A memory 41 may also be configured to store data, e.g. from measurements and/or calculations.

Additionally, the control system 36 may also include a communications module 43 to facilitate communications between the controller 36 and the various components of the wind turbine 10. For instance, the communications module 43 may serve as an interface to permit the turbine controller 36 to transmit control signals to a pitch drive system 66 for controlling the pitch angle of the rotor blades 22. The communications module 43 may be configured to communicatively connect the control system 36 with other elements of the wind turbine 10. Connecting may be carried out via a wired connection and/or via a wireless connection, e.g. by using any suitable wireless communications protocol known in the art. Moreover, the communications module 43 may include a sensor interface 49, e.g. one or more analog-to-digital converters, to permit signals transmitted from one or more sensors 51, 53, 58 to be converted into signals that can be understood and processed by the processors 40.

Figure 4:
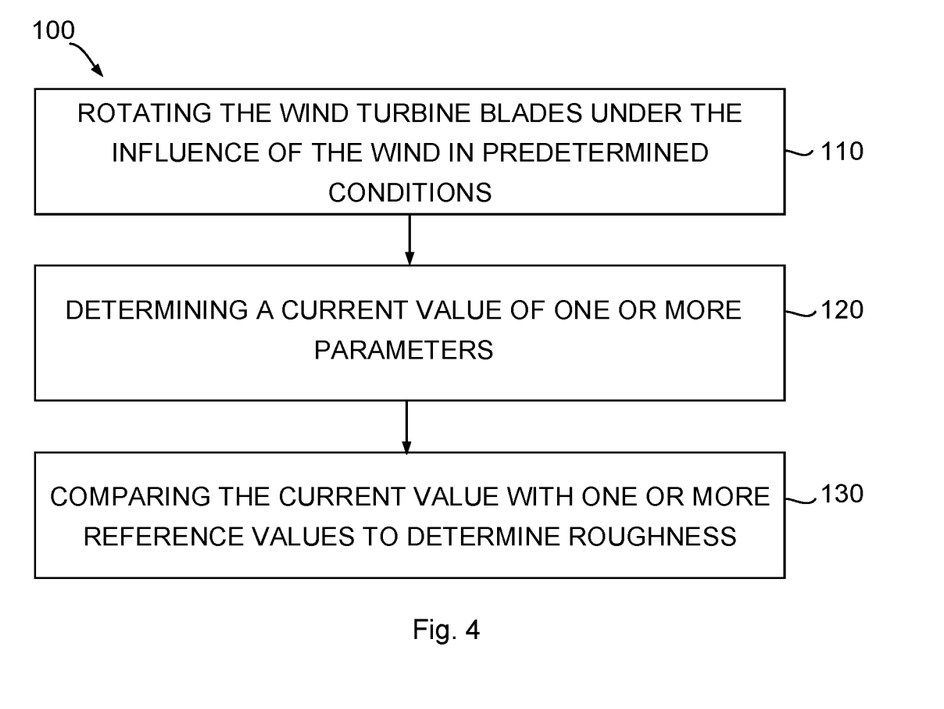
FIG. 4 shows a flow chart of an example of a method for operating a wind turbine for detecting blade roughness.

A method 100 for determining a surface condition of one or more wind turbine blades 22 of a wind turbine 10 comprising a rotor 18 including a first wind turbine blade 221 and one or more additional wind turbine blades 222, 223 (with reference to the numbering used in FIG. 6) is provided. The method is schematically shown in the flow chart of FIG. 4. The method comprises, at block 110, rotating the wind turbine blade rotor 18 under the influence of a wind in predetermined rotation conditions. The predetermined rotation conditions include at least a predetermined pitch angle 252 of the one or more additional wind turbine blades 222, 223. The method further comprises, at block 120, determining a current value of one or more parameters of the wind turbine 10 when rotating in the predetermined rotation conditions. The method further comprises, at block 130, comparing the current value of one or more parameters of the wind turbine 10 with one or more reference values 37 to determine the surface condition (and particularly an indication or state of roughness) of one or more of the wind turbine blades 221, 222, 223.

Parameters may herein be understood to be characteristics that help define or describe the operation of the wind turbine in the predetermined rotation conditions. Parameters may herein include control settings (i.e. setpoints for actuators or elements such as a pitch angle, generator torque or other) and/or measured variables (e.g. rotor speed). It may be understood that "predetermined" refers to the fact that the rotation conditions are determined in advance, i.e. before rotation of the rotor 18 in certain conditions is started. "Predetermined" should not necessarily be interpreted as certain condition(s), e.g. certain parameter value(s), being kept constant during an entire period of time in which rotation of the rotor occurs. In some examples this could be the case (for example, one or more pitch angles 25 may be kept substantially constant while performing method 100), but in other examples this may not be the case (for example, a particular rotor speed may be set for rotation, but this speed may vary over time due to blade roughness).

Figure 5A:
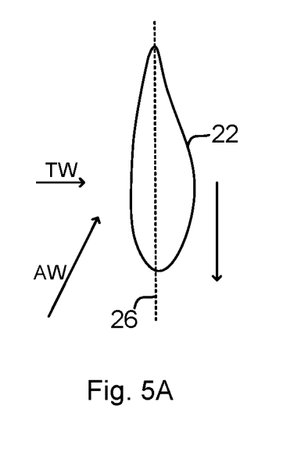
FIGS. 5A, 5B and 5C schematically illustrate different pitch angles of a wind turbine blade according to an example.
Figure 5B:
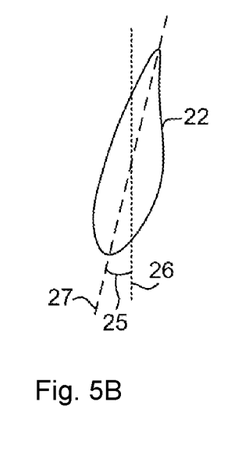
Figure 5C:
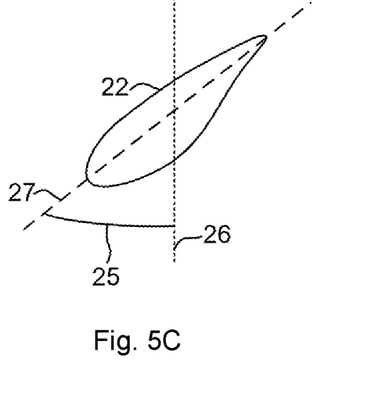

Throughout this disclosure, a pitch angle of a wind turbine blade 22 may be understood as an angle 25 that may be measured, in cross-section, between a reference line 26 and a chord of the blade 27, see FIGS. 5A, 5B and 5C. The reference line 26, indicated as a dotted line in FIGS. 5A, 5B and 5C, may be substantially parallel to a rotor plane of a wind turbine 10. FIGS. 5A, 5B and 5C schematically illustrate a blade 22 in cross-section. The wind, see arrow "TW", may blow from left to right in these figures. The wind turbine blade 22 rotates in the rotor 18 plane and moves, in this figure, in a downwards direction, resulting in an apparent wind flow, see arrow "AW" upwards. The apparent wind AW is composed of the wind caused by the rotation of the blade and the wind blowing against the blades 22 in an axial direction TW.

The right hand side of the profiles shown in FIG. 5 may be understood to be the suction side of the blade, whereas the left hand side may be understood to be the pressure side of the blade.

In FIG. 5A, the blade is in a reference position for the pitch angle 25. In the reference position, a chord 27 of the blade is substantially parallel to the reference line 26. In FIG. 5A, a chord 27 of the blade and the reference line 26 overlap. The pitch angle 25 may therefore be 0° or a "default pitch angle". The default pitch angle, or "reference position" may be a position that the wind turbine blade 22 will maintain over a range of low wind speeds, e.g. of sub-nominal wind speeds.

In FIG. 5B, the blade has been pitched away from the reference position. A pitch angle 25 in FIG. 5B is therefore higher in FIG. 5B than in FIG. 5A. In FIG. 5C, the pitch angle 25 has been further increased with respect to the reference position. Increasing the pitch angle 25 may generally slow down the wind turbine rotor i.e. the wind turbine blade is set in a position in which it is configured to generate less lift and more drag to reduce the aerodynamic torque of the wind turbine rotor. Pitching the blades 22 about 90° from the reference position may put the wind turbine in a feathered position and possibly stop it or at least greatly reduce its rotational speed. The feathered position of the blades is the position in which the blades may be placed when the wind turbine is parked. Similarly, reducing the pitch angle 25, e.g. from a feathered position, may increase the rotational speed of the wind turbine rotor 18.

Figure 6:
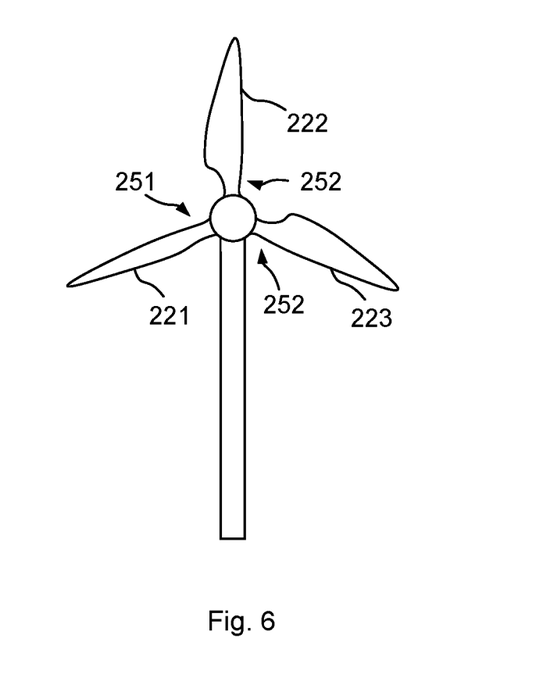
FIG. 6 schematically illustrates a frontal view of an example of a wind turbine with a first blade positioned at a first pitch angle and with a second blade and a third blade positioned at a second pitch angle, the value of the first pitch angle being higher than the value of the second pitch angle.

Accordingly, pitching the blades 22 may be used for accelerating and slowing the rotation of the rotor 18. Rotating the wind turbine rotor 18 under the influence of the wind in predetermined rotation conditions, e.g. at least with all the blades except one at a known pitch angle 25, may help to determine whether one or more blades 22 have a roughened surface or not. For example, a first blade 221 may be positioned at a first pitch angle 251 higher than a second pitch angle 252 of the other blades 222, 223, e.g. the other two blades. In this example, the predetermined rotation conditions would therefore include the predetermined first pitch angle 251 and the predetermined second angle 252. When the rotor is rotated, the first blade 221 may tend to slow down the rotor 18 of the wind turbine 10 whereas the other blades, e.g. the second 222 and third 223 blades, may tend to accelerate the rotor 18. A schematic illustration of such an example is depicted in FIG. 6. In the example of FIG. 6, the first wind turbine blade 221 has a higher pitch angle 251 than a pitch angle 252 of the second blade 222 and the third blade 223. The second 222 and third 223 blades therefore tend to accelerate the rotation of the rotor 118, and the first blade 221 tends to break this rotation, i.e. to slow down the rotation of the rotor 118.

Determining one or more current values of one or more parameters and comparing one or more of the determined values to corresponding known reference values, e.g. with a first blade positioned at a predetermined first pitch angle 251 higher than a predetermined second pitch angle 252 at which the remaining blades are positioned, may allow checking whether the roughness of the blades 22 has increased after some time of operation of the wind turbine 10. Determining a current value may in general include both direct measurements and indirect measurements. Instead of attaching sensors to the blades 22, using drones, cameras or other ways which require additional equipment and/or operators for checking whether a blade has roughened during operation, method 100 may be used. This method may provide a faster, more convenient and less expensive check on blade roughness.

Figure 7:
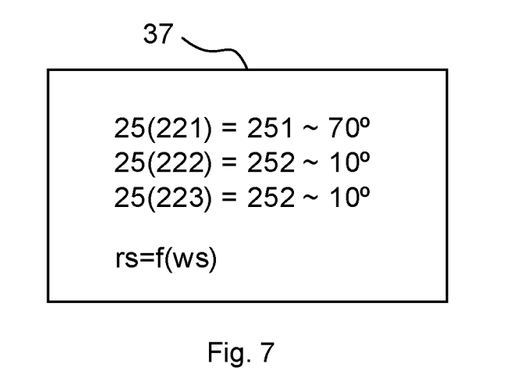
FIG. 7 schematically illustrates a set of reference values.

A parameter may have one or more values. If the values of the parameters have been determined in certain known reference conditions, e.g. for clean blades, and e.g. blade being positioned at a first pitch angle higher than a second pitch angle of the remaining blades, these values may be referred to as reference values. In some examples the reference values therefore correspond to a clean blade. A set of reference values 37 is schematically illustrated in FIG. 7. In the example of FIG. 7, a first pitch angle 251 has a reference value of about 70° and a second pitch angle 252 has a reference value of about 10°. The set of reference values 37 further comprises a plurality of values of a speed of rotation of the rotor 18 at a plurality of values of wind speed. Such a curve of data has been represented as rs=f(ws) in FIG. 7B.

In some examples, the predetermined rotation conditions may comprise a predetermined pitch angle 251 of the first blade 221, and the parameters of the wind turbine may include a speed of rotation. I.e., a current value of a speed of a wind turbine rotor 18 may be determined and then compared to a reference value of wind turbine rotor speed. The determination may be performed at a certain wind speed and the comparison may accordingly be to a reference value of rotor speed at substantially the same wind speed. For instance, the first blade 221 may be positioned at the reference value of the first pitch angle 251 and the remaining additional blades 222, 223 may be positioned at the reference value of the second pitch angle 252. The current wind speed may for example be determined by a meteorological measurement system 58, e.g. a wind anemometer. The current value of rotor speed may for instance be determined by a shaft sensor 51 or a generator sensor 51. The current value of the speed of the wind turbine rotor at a current wind speed may be compared to a reference value of the speed of the wind turbine rotor at a corresponding wind speed.

Figure 8:
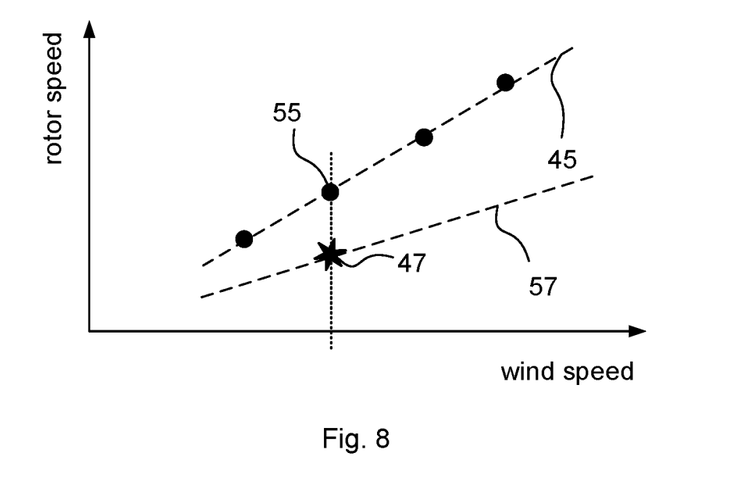
FIG. 8 schematically illustrates an example of an evolution of a reference wind turbine rotor speed as a function of wind speed as well as an example of a determined current value of rotor speed.

FIG. 8 schematically illustrates an example of a reference curve (dashed line 45) of speed of a wind turbine rotor 18, measured e.g. in revolutions per minute (rpm), as a function of wind speed, measured e.g. in meters per second (m/s). The rotor speed data (circles) may be fitted according to a suitable equation, e.g. a linear equation, to obtained intermediate values of data. The dashed line 45 represents a fit for the rotor speed data. FIG. 8 also illustrates an example of a value of a current rotor speed at a current wind speed, which has been labeled as 47. As the current value of rotor speed 47 is in this example lower than a corresponding reference rotor speed 55, it may be concluded that the blades are rougher than before.

By comparing the values of rotor speed it may be seen whether the current value is substantially the same as the reference one, which may be indicative of absence of irregularities on the blades 22, or whether it is lower than the reference speed, which may indicate that the blades 22 have roughened. The operation of the wind turbine may be adjusted depending on the outcome of the comparison.

In some examples, the predetermined rotation conditions may comprise a predetermined pitch angle 251 of the first blade 22, and the parameters of the wind turbine 10 that are measured or otherwise determined may include a tip speed ratio (TSR). I.e., a current value of a tip speed ratio may be determined and compared to a reference value of a TSR. The first blade 221 may be positioned at the reference value of the first pitch angle 251 and the remaining blades 222, 223 may be positioned at the reference value of the second pitch angle 252 before the determination is made. In some of these examples, a TSR may be determined by first measuring a current (e.g. angular) rotor speed (rs) and a current wind speed (ws) measured e.g. by a nacelle anemometer, and then calculating a current tip speed by taking into account a length of the blade 22 (L). This value may then be divided by the measured current wind speed (ws) for obtaining the TSR. The current speed of the wind turbine rotor 18 may e.g. be measured in revolutions per minute (rpm), in some examples. Other ways of determining a TSR may be possible. The determined current TSR may be compared to a reference TSR.

As a TSR is a ratio of speed of a blade tip to a wind speed. Determining a TSR and comparing it to a TSR reference value may be less limitative than determining a rotor speed and comparing it to a corresponding reference value. A slope of a rotor speed reference curve 45 may be related to the value of the reference TSR, in particular the TSR and the slope may be related by a constant of proportionality that includes the length of the blades. FIG. 8 also illustrates that a slope of a possible current curve of rotor speed as a function of wind speed 57, and therefore a current TSR value, may be less than a value of a slope of the reference curve 45, and therefore of a reference TSR.

In some examples, the predetermined rotation conditions may comprise a predetermined rotor speed, and the parameters of the wind turbine may include a pitch angle 251 of the first blade 221 to maintain the predetermined rotor speed. In some of these examples, the remaining blades 222, 223 may be positioned at the reference value of the second pitch angle 252, and optionally the first blade 221 may be positioned at the reference value of the first pitch angle 251, before the determination is made. In other examples, such positioning may be omitted. The controller 36 may know that, with clean or semi-clean blades 22, a certain speed of the rotor 18 may be attained with a selected configuration of pitch angles 251, 252. During a blade roughness check, the first pitch angle 251 may be varied to reach and maintain a particular reference value of rotor speed. The pitch angle 251 needed to maintain a specific rotor speed may be indicative of whether the blades keep a regular surface or whether irregularities such as recesses and/or protrusions have appeared on the blade surface.

For example, if a required current value of the first pitch angle 251 is substantially the same as a corresponding reference value of the first pitch angle 251, it may be concluded that the blades remain clean or semi-clean. However, if the value of the first pitch angle 251 necessary for keeping a substantially constant rotor speed is lower than a corresponding reference value, this may mean that the blade surface of one or more of the blades has been modified and negatively affects the wind turbine performance. According to the explanations given with respect to FIG. 5A-6, a current value of the first pitch angle 251 lower than a reference value of the first pitch angle may mean that, for reaching and maintaining certain rotor speed, rotation of the rotor 18 has to be favored. I.e., if a blade, in particular the additional blade 222 or 223, is now rough, it may be necessary to decrease the first pitch angle 251 for increasing the speed of rotation and therefore be able to reach the reference rotational speed.

A blade 222, 223 which has a second pitch angle 252 as a reference pitch angle 25 may likewise be used for performing a roughness check. In some examples, a pitch angle 252, 253 of one of the remaining blades 222, 223 may be varied for keeping a substantially constant speed of rotation, whereas a first pitch angle 251 of the first blade 221 and the second pitch angle 252 of the other blades may be kept substantially constant.

In some examples, the predetermined rotation conditions may include a pitch angle 251 of the first blade 221 and a predetermined rotor speed, and the parameters of the wind turbine may include a generator torque to maintain the predetermined rotor speed. I.e., a value of a torque provided by a wind turbine generator 42 for keeping a known speed, e.g. a certain reference speed, of a wind turbine rotor 18 may be determined and then compared to a reference value of torque. The first blade 221 may be positioned at the reference value of the first pitch angle 251 and the remaining blades 222, 223 may be positioned at the reference value of the second pitch angle 252 before the determination is made. For example, it may be known that, with clean or semi-clean blades, a certain speed of the rotor 18 may be attained with a selected configuration of pitch angles 251, 252. To maintain that rotor speed, a certain value of generator torque may be required. During the roughness check, torque may be varied to reach and maintain that predetermined rotor speed. If a required current value of torque is substantially the same as a corresponding reference torque value, it may be concluded that the blades remain clean or semi-clean. However, if the torque necessary for keeping a substantially constant rotor speed is lower than a reference value of torque, this may mean that one or more of the blades have a surface with increased roughness.

In some examples, the predetermined rotation conditions may include idling of the wind turbine 10. I.e., in some examples, the method may further comprise starting to idle the wind turbine rotor 18 before determining a current value of one or more parameters. Herein, idle or idling may refer to the fact that the wind turbine blades 22 are (slowly) rotating but no energy is produced, namely because the generator 42 is not connected to the grid. An idling rotor 18 may facilitate observing variations in blade roughness and measuring relevant parameters. The rotor 18 may for instance be set to idle before determining a current value of a rotational rotor speed, a tip speed ratio, or one or more pitch angles 25. A power converter and the grid may be used to vary generator torque in some examples, whereas other power sources may be used in other examples. For example, one or more auxiliary or additional power sources may be used for using the wind turbine generator 42 as a motor. If determination of current values is done during idling, the reference values may be determined during idling as well to make a direct comparison more meaningful.

Regarding the values of the second pitch angle 252, and optionally also of the first pitch angle 251, in predetermined rotation conditions, a pitch angle 251 of the first blade 221 may be higher than the pitch angle 252, 253 of the other blades 222, 223. These predetermined values, as well as the reference values for the second pitch angle 252, and optionally of the first pitch angle 251, may be chosen such that the effect of roughness in one or more parameters to be determined may be maximized, or at least increased, with respect to other values of the pitch angle 25.

In some examples, a predetermined and/or reference value of the second pitch angle 252 may be near a stall position. I.e., the second pitch angle 252 may be less than a pitch angle above which stall takes place, but close to this angle. The effects of a rough blade surface may be measured easier at such pitch angles. In some examples, a predetermined and/or reference value of the second pitch angle 252 may be between 0° and 30°, and more in particular between 5° and 15°. In some of these examples, a reference value of the second pitch angle 252 may be about 10°.

A predetermined and/or reference value of the first pitch angle 251 may be chosen to optimize the measurement conditions. For example, the first pitch angle may be selected to adapt the speed of rotation of the rotor 18. If the rotor turns too fast, the wind turbine blade may be damaged due to the overspeed. The first pitch angle 251 may also be chosen such that the determined values may be distinguished from an accuracy of the measurement, e.g. such that a variation in the parameter of interest due to blade roughness is increased with respect to other possible values of the first pitch angle 251. In some examples, a predetermined and/or reference value of the first pitch angle 251 may be between 45° and 90°, and more in particular between 60° and 80°. In some of these examples, a reference value of the first pitch angle 252 may be about 70°.

In some examples, the pitch angle 251 of the first blade 221 may be in a range of 45° to 90°, specifically in a range of 60° to 80°, and the pitch angle 252 of the other blades 222, 223 may be in a range of 0° to 30°, specifically in a range of 5° to 15°.

For most implementations, it may be sufficient to determine blade roughness in general i.e. without differentiating between the individual blades. In most occasions a build-up of matter or erosion may be assumed to occur at similar rates for all blades of a wind turbine rotor.

It may happen however that the different blades roughen at different rates. In view of this, in some examples, the method may further comprise repeating the steps of rotating, determining and comparing with one or more, e.g. all, of the additional blades 222, 223 acting as the first blade. Repeating the determination of current values of one or more parameters and comparing the determined current values to corresponding reference values for each rotor configuration, i.e. a configuration in which a particular blade 221 is positioned at a particular first pitch angle 251 and the remaining blades 222, 223 are positioned at a particular second pitch angle 252, may help to differentiate which blade 22 is more irregular in case they have experienced a different evolution in roughness.

For the sake of illustration, let us assume that the first blade 221 is rougher than the remaining blades 222, 223, and that a current value of the first pitch angle for keeping a speed of the rotor substantially constant is to be compared with a reference value of the first pitch angle. In such a situation, when a current value of the first pitch angle is determined for each rotor configuration, it may be seen that the current value in the rotor configuration in which the pitch angle of the first blade 221 is varied is different than a current value in the other rotor configurations in which a pitch angle of the remaining blades is varied.

It is noted that examples of the methods may be carried out regardless of the predetermined rotation conditions selected, at a wind speed prevailing at the moment. I.e. waiting for specific wind conditions to perform these methods may be avoided.

In some examples, any of the above methods may be performed as part of a method of operating a wind turbine 10. Such a method of operating a wind turbine 10 may comprise operating the wind turbine with default control settings. The method may further comprise carrying out the above method 100. The method may further comprise adjusting the operation of the wind turbine if the current values of the parameters differ from the reference value by, or in more than, a predetermined threshold.

In some examples, the wind turbine 10 may be operated with default control settings upon starting of operation after installation and commissioning. Suitable control settings may be based on prototype testing, simulation and other. The reference values to be used in the methods for determining roughness of the blades may have been determined during installation or commissioning of a wind turbine after all the blades have been installed. Additionally or alternatively, the reference values may have been determined after an occurrence of a certain event subsequent to the start of operation of the wind turbine in other examples, e.g. after the blades 22 have been cleaned, replaced or repaired. For example, if a wind turbine has already been operating for a while, its blades may be cleaned and then reference values may be determined for the cleaned blades. It may also be possible that one or more of the wind turbine blades may be replaced and then reference values may be determined for the new rotor 18. Replaced blades may be considered clean blades. Cleaned blades may be considered semi-clean blades.

In some examples, the method of operating may further comprise determining a reference curve 45 of a speed of a wind turbine rotor as a function of wind speed, e.g. for clean or semi-clean blades, a first blade 221 positioned at the reference value of the first pitch angle 251 and the remaining blades 222, 223 positioned at the reference value of the second pitch angle 252. For example, a curve 45 similar to the one schematically illustrated in FIG. 7 may be obtained.

Values of a wind speed and of a speed of a rotor 18 may be determined during a certain period and then averaged. In some examples they may be measured during one, five, ten or more minutes. In some examples, they may be measured during a time period in which a wind speed is, or may be deemed to be, substantially constant. In some of these examples, a wind speed may be considered to be substantially constant during a time period if the values of wind speed stay within an interval defined by the average value of wind speed plus and minus 10% of the average value of wind speed, i.e. within an interval [0.9·average wind speed, 1.1·average wind speed]. This explanation may be applicable to any value which is directly measured, e.g. any suitable reference value as well as any suitable current value. For instance, a current value of a parameter of a set of parameters may be determined as an average value of a plurality of values measured during a period of time, e.g. during ten minutes.

When the blades 22 are clean, they should all perform equally well. Accordingly, having a set of reference values 37 for a single rotor configuration may be enough. Therefore, it may be indifferent which clean blade has the higher reference pitch angle 251 as the obtained reference values may be the same regardless of this. However, determining more than one set of reference values 37, e.g. determining N sets of reference values, N being equal to the number of blades 22 of the wind turbine 10, is not precluded and could be performed. This may be performed for instance if semi-clean blades are to be used for determining reference values.

In some examples, adjusting the operation of the wind turbine 10 may include one or more of changing control settings, outputting a status message and triggering a corrective action. In some examples, a message may indicate whether a particular blade, or all the blades in general, are as clean as before or are rougher. A level of roughness may be indicated. For instance, a variation of a current value of a parameter with respect to a corresponding reference value of the parameter may be linked to a certain degree of roughness. Different thresholds may be created, either with regard to absolute values (e.g. parameter X has reached value Y) or to relative values (e.g. parameter X has changed more than Y %). Depending on how much a current value differs from a reference value, different messages may be configured and/or different actions may be taken. A corrective action may be triggered if blade roughness, e.g. blades roughness above a predetermined threshold, is detected. A corrective action may aim at decreasing blade roughness and/or, as roughness may have decreased power output, to increase power production of the wind turbine. A corrective action may include one or more of repairing, replacing, cleaning, defrosting, pitching and varying a TSR of one or more blades. Other corrective actions may be possible. A status message may also recommend a particular corrective action.

In examples, control settings may be changed to continue operation of the wind turbine taking into account eh actual state of the wind turbine blades. E.g. PID settings, and/or generator torque control and/or aerodynamic actuator settings may be changed after the finding of a different surface roughness of the blades.

In some examples, the method may be performed at regular predetermined intervals, e.g. daily, once per week or once per month. In other examples, the method may be performed after a manual indication or request, e.g. by an operator. In some examples, the method may be triggered after the occurrence of certain environmental conditions, e.g. rain, a storm or snow.

According to a further aspect, a controller 36 for a wind turbine 10 is provided. As explained with respect to FIG. 3, the controller 36 comprises a communications module 43, a processor 40 and a memory 41. The memory 41 comprising instructions that, when executed by the processor 40, cause the processor to the methods disclosed herein. A wind turbine 10 comprising such a controller 36 may also be provided.

In a further aspect of the disclosure, a method 200 for controlling a wind turbine 10 is provided. The method is shown in the flow chart of FIG. 9. Aspects and explanations with respect to method 100 may be combined and applied to method 200 and vice versa.

Figure 9:
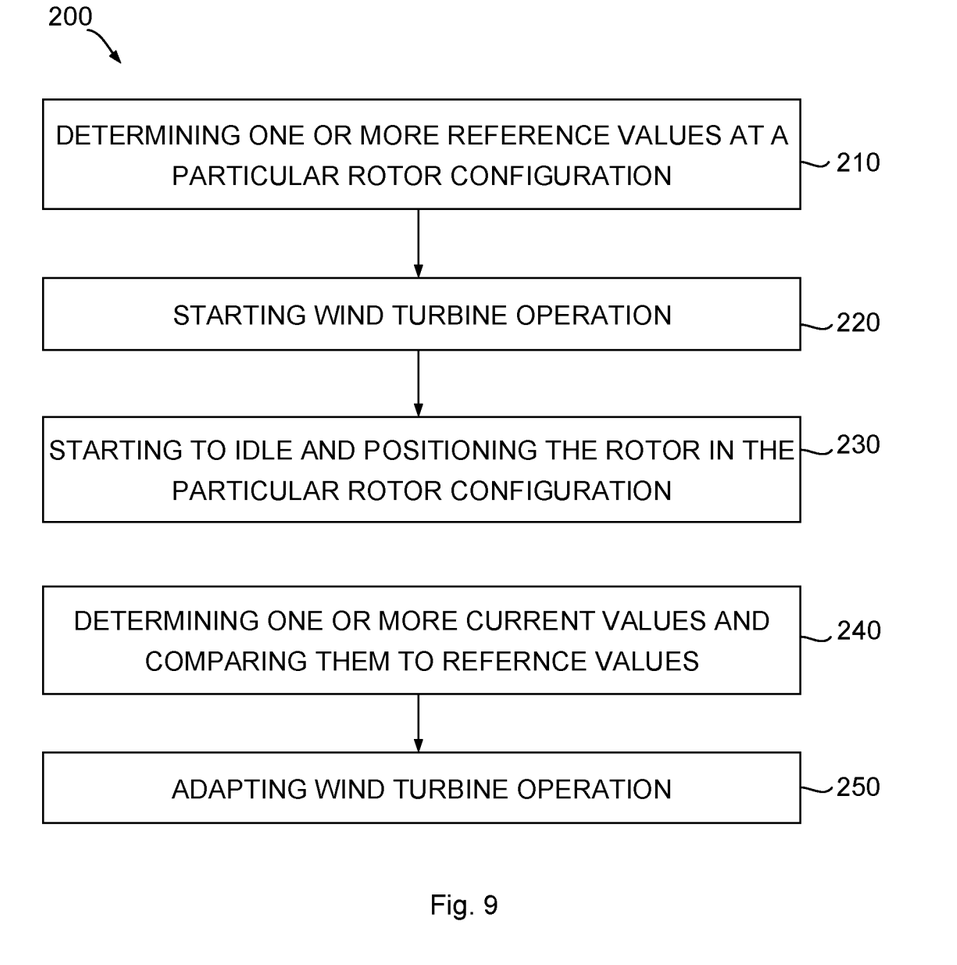
FIG. 9 shows a flow chart of an example of a method for controlling a wind turbine.

The method 200 comprises, at block 210, determining one or more reference values of one or more wind turbine parameters 35 with a first blade 221 positioned at a reference value of a first pitch angle 251 and the remaining blades 222, 223 positioned at a reference value of a second pitch angle 252 for an idling wind turbine rotor 18 before the wind turbine starts 10 to operate. Determining one or more reference values may comprise in some examples measuring a reference curve of a speed of a wind turbine rotor as a function of wind speed. Determination of reference values may be performed after all the wind turbine blades 22 have been installed on the wind turbine 10 during wind turbine installation or commissioning. In some examples, the reference values of the first pitch angle 251 and the second pitch angles 252 may be between 60° and 80°, and between 5° and 20°, respectively. For example, a reference value may be set about 70° for first pitch angle 251 and a reference value may be set about 10° for the second pitch angle.

The method further comprises, at blocks 220 and 230, starting wind turbine operation; and after a period of time, starting to idle the wind turbine rotor 18 and positioning the first blade 221 at the reference value of the first pitch angle 251 and the remaining blades 222, 223 at the reference value of the second pitch angle 252.

The method further comprises, at block 240, determining one or more current values of one or more wind turbine parameters and comparing them to the corresponding reference values. In some examples, one or more reference values and one or more current values are obtained at least for one of a rotor speed and a tip speed ratio.

The method further comprises, at block 250, adapting the wind turbine operation based on the comparison. Adapting the operation of the wind turbine may comprise one or more of outputting a status message and, if blade roughness is detected, triggering a corrective action or an operative change as described before. A corrective action may include one or more of repairing, replacing, cleaning, defrosting, pitching and varying a tip speed ratio of one or more blades.

In some examples, after a corrective action is implemented, steps 230 and 240 may be performed again for checking whether the corrective action has been successful. For instance, if blade roughness due to the presence of ice on one or more blades 22 is detected, the wind turbine 10 may be stopped. The blades may be de-iced, and then the rotor 18 may be idled and the blades 22 pitched to suitable pitch angles (step 230). One or more current values of parameters may be determined and compared to corresponding reference values (step 240). This may allow to verify whether the de-icing has been successful or not. If successful, the wind turbine 10 may be re-started.

This written description uses examples to disclose the teaching, including the preferred embodiments, and also to enable any person skilled in the art to put the teaching into practice, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for determining a surface condition of one or more wind turbine blades of a wind turbine, wherein the wind turbine includes a rotor with a first wind turbine blade and one or more additional wind turbine blades, the method comprising:

rotating the rotor under the influence of wind in predetermined rotation conditions that include at least a first predetermined pitch angle of the first wind turbine blade and a second predetermined pitch angle of the one or more additional wind turbine blades, the second predetermined pitch angle different than the first predetermined pitch angle;

determining a current value of one or more parameters of the wind turbine when rotating the rotor in the predetermined rotation conditions;

comparing the current value of the one or more parameters of the wind turbine with one or more reference values to determine the surface condition of the wind turbine blades; and wherein the one or more reference values correspond to values for clean wind turbine blades in the same predetermined rotation conditions with the first wind turbine blade at the first predetermined pitch angle and the one or more additional wind turbine blades at the second predetermined pitch angle.

2. The method of claim 1, wherein the predetermined rotation conditions further comprise idling of the wind turbine.

3. The method of claim 1, wherein the parameters of the wind turbine include a rotor speed.

4. The method of claim 1, wherein the the parameters of the wind turbine include a tip speed ratio.

5. The method of claim 1, wherein the predetermined rotation conditions further comprise a predetermined rotor speed, and the parameters of the wind turbine include a change in the first predetermined pitch angle of the first wind turbine blade to maintain the predetermined rotor speed relative to a reference value of the first predetermined pitch angle.

6. The method of claim 1, wherein the predetermined rotation conditions further comprise a predetermined rotor speed, and the parameters of the wind turbine include a generator torque to maintain the predetermined rotor speed.

7. The method of claim 1, wherein the first predetermined pitch angle of the first wind turbine blade is in a range of 45-90°, and the second predetermined pitch angle of the one or more additional wind turbine blades is in a range of 0-30°.

8. The method of claim 1, further comprising repeating the steps of rotating, determining, and comparing after designating a different one of the wind turbine blades as the first wind turbine blade.

9. A method of operating the wind turbine, comprising:
operating the wind turbine with default control settings;
carrying out the method according to claim 1; and
adjusting operation of the wind turbine if the current value of the parameters differs from the reference value by or in more than a predetermined threshold.

10. The method of claim 9, furthermore comprising determining the one or more reference values prior to operation of the wind turbine.

11. The method of claim 9, further comprising determining a reference curve of a speed of the wind turbine rotor as a function of wind speed with the first wind turbine blade positioned at a reference value of a first pitch angle, and the one or more additional wind turbine blades positioned at the predetermined pitch angle.

12. A controller for the wind turbine, the controller comprising a communications module, a processor, and a memory; the memory comprising instructions that, when executed by the processor, cause the processor to execute the method of claim 9.

13. The wind turbine comprising the controller of claim 12.

* * * * *